United States Patent
Baldwin et al.

(12) 
(10) Patent No.: US 6,969,417 B2
(45) Date of Patent: Nov. 29, 2005

(54) CATALYTIC ALLOY FOR THE DISSOCIATION OF WATER INTO HYDROGEN AND OXYGEN AND METHOD OF MAKING

(75) Inventors: Edward W. Baldwin, Cave Junction, OR (US); Russell P. White, Jr., Lindale, TX (US)

(73) Assignee: Hydrogen Energy America, LLC, Henderson, NV (US)

( * ) Notice: Subject to any disclaimer, the term of this patent is extended or adjusted under 35 U.S.C. 154(b) by 379 days.

(21) Appl. No.: 09/885,776

(22) Filed: Jun. 19, 2001

(65) Prior Publication Data

US 2001/0053346 A1 Dec. 20, 2001

Related U.S. Application Data

(60) Provisional application No. 60/212,261, filed on Jun. 19, 2000.

(51) Int. Cl.[7] .............................. C22C 5/04; C22C 11/00
(52) U.S. Cl. ......................... 75/363; 420/466; 420/554; 420/564; 502/334; 502/344
(58) Field of Search ........................... 75/363; 502/334, 502/344; 420/400, 466, 554, 564

(56) References Cited

U.S. PATENT DOCUMENTS

| | | |
|---|---|---|
| 909,536 A | 1/1909 | Brindley |
| 934,036 A | 9/1909 | Brindley |
| 3,346,506 A | 10/1967 | Beumel, Jr. ................. 252/188 |
| 3,674,702 A | 7/1972 | MacKenzie et al. ......... 252/188 |
| 3,705,029 A * | 12/1972 | Foerster ....................... 420/549 |
| 3,786,139 A | 1/1974 | MacKenzie et al. ......... 423/657 |
| 3,895,102 A | 7/1975 | Gallagher .................... 423/657 |
| 3,985,866 A | 10/1976 | Oda et al. .................... 423/657 |
| 4,017,414 A | 4/1977 | Black et al. ................. 252/188 |
| 4,155,712 A | 5/1979 | Taschek ....................... 422/239 |
| 4,289,744 A | 9/1981 | Anderson .................... 423/579 |
| 4,308,248 A | 12/1981 | Anderson .................... 423/579 |
| 4,404,170 A | 9/1983 | Caudy et al. ................ 422/237 |
| 4,511,398 A * | 4/1985 | Kugler ......................... 75/587 |
| 4,547,356 A | 10/1985 | Papineau .................... 423/658 |
| 4,732,820 A * | 3/1988 | Mori ........................... 428/650 |
| 5,058,653 A * | 10/1991 | Garat .......................... 164/34 |
| 5,634,341 A | 6/1997 | Klanchar et al. ............. 60/673 |
| 5,867,978 A | 2/1999 | Klanchar et al. ......... 60/39.182 |

FOREIGN PATENT DOCUMENTS

JP              58055303          4/1983          ............. C01B/3/04

OTHER PUBLICATIONS

ASM Handbook, vol. 15, Casting, 1988, ASM International, p. 38.*
"The Powerball Concept—Use the Sodium–Water . . . Hydrogen Energy on Demand Without Pressure," http://www.powerball.net/inside/concept/index.shtml, pp. 1–7.

* cited by examiner

*Primary Examiner*—George Wyszomierski
(74) *Attorney, Agent, or Firm*—Kilpatrick Stockton, LLP

(57) ABSTRACT

The present invention provides a method for combining sodium and aluminum into a single, substantially homogeneous alloy without the need to use potentially dangerous, toxic mercury compounds. The present invention also provides a catalytic alloy that is capable of dissociating water into hydrogen and oxygen, thereby allowing the hydrogen to be utilized as fuel.

23 Claims, No Drawings

CATALYTIC ALLOY FOR THE DISSOCIATION OF WATER INTO HYDROGEN AND OXYGEN AND METHOD OF MAKING

This application claims benefit of the filing date of U.S. Provisional Ser. No. 60/212,261, filed Jun. 19, 2000, the entire contents of which are hereby incorporated by reference.

BACKGROUND OF THE INVENTION

1. Field of Invention

This invention relates to an amalgam-free catalytic alloy of materials for the dissociation of water into hydrogen and oxygen gases, and to methods for making this alloy.

2. Description of Prior Art

In the continuing effort to provide an alternative fuel to reduce dependence on fossil fuels and to reduce or eliminate the pollution from the burning of fossil fuels it is generally agreed that the element hydrogen is the most abundant fuel in the universe and the most non-polluting, since the reaction product of its combustion is pure water. Despite its widespread availability and obvious virtues, hydrogen has not yet been utilized as a fuel of choice due to a number of technological problems which have not as yet been solved. These problems generally relate to devising safe, efficient, and economical methods of production, storage, transport, and utilization of hydrogen in sufficient quantities to make use of this fuel economically feasible.

Many methods have been described for the generation of hydrogen gas in almost unlimited quantities. The elementary electrolysis of water, gasification of coal, steam reforming of natural gas, partial oxidation of heavy oils and the use of nuclear reactors to break down steam into its component elements are the most common. Without exception, however, these schemes for production of large quantities of hydrogen gas require extensive capital equipment, large production capabilities, and an input of significant external energy.

In addition, hydrogen gas is a highly explosive element. Therefore the storage and transport of the gas as a fuel presents multiple problems in efficiency and safety which, despite numerous ingenious endeavors, have not as yet been solved sufficiently to provide a safe and economically viable utilization of the gas as an alternative fuel. To overcome the problems of storage and transport of the gas a number of investigators have devised various methods of generating the gas on a demand basis at the point of utilization. Though most utilize a thermo-chemical or electrochemical scheme to dissociate water into either hydrogen and a salt, or into hydrogen and oxygen, work has also been done on the reforming of natural gases and gasoline into hydrogen, carbon dioxide and carbon monoxide.

It is known that the alkali metals react with water to form hydrogen and the stable alkali metal hydroxide (see, e.g., U.S. Pat. Nos. 5,817,157, 5,782,464, Checketts, the entire contents of which are hereby incorporated by reference). The foregoing reaction, however, is rapid and violent, the heat generated is intense, and explosion of the hydrogen often occurs. In order for the technique in the Checketts patent, for example, to provide sufficient hydrogen for any practical purpose the size of the sodium pellets presented sequentially to the water would have to be of such size as to initiate the violent, rapid and dangerous reaction noted.

It is also known that the reaction of alkali hydroxides with a metal and water will also release hydrogen and form the alkali-metal hydroxide (see, e.g., U.S. Pat. No. 5,690,902, the entire contents of which is hereby incorporated by reference). These techniques, however, can also result in rapid and violent reaction. They also produce an alkali-metal hydroxide, which can rapidly deteriorate the efficacy of the technique. Numerous closed cycle, often multi-stepped processes, which dissociate water into hydrogen and oxygen are disclosed in U.S. Pat. Nos. 3,821,358; 3,928,549; 4,011,305; 3,969,495 and 3,574,561, the entire contents of each of which is hereby incorporated by reference. Of particular interest are the simple methods of dissociating water into hydrogen and oxygen as demonstrated in U.S. Pat. Nos. 4,182,748; 4,207,095; 4,287,169, and 4,289,744, issued to Eugene R. Anderson, the entire contents of each of which are hereby incorporated by reference. These patents utilize a combination of alkali metals with an extender and catalysts to control the rate of reaction and to restore the alkali metals to their elemental state as the process proceeds.

Unfortunately, from the description of the invention in these related (Anderson) patents a person reasonably skilled in the art is unable, by following the procedures as described, to actually fabricate such a catalytic alloy that will function as claimed. The description describes a multi-step process in which an amalgam of mercury, aluminum and sodium is prepared; an alloy of metal extender and various catalysts are prepared; both the amalgam and alloy are ground to a fine powder; the powders are intermixed; and the mixture, under high pressure, is heated to the melting point of the mixture. The resulting product is then cooled and supposedly ready for use. While an amalgam of mercury, aluminum and sodium is a logical step to gain a mixture of two metals which will not naturally alloy, the procedures described for the formation of the amalgam at elevated temperatures in a graphite crucible in a nitrogen atmosphere will quite often result in the formation of fulminate of mercury, a highly explosive compound. While the amalgam is ostensibly a part of the finished product, the heating of the eutectic mass under pressure to its melting point requires a temperature considerably above the sublimation and boiling point of mercury. The result is that the mercury is driven off in a vapor, destroying the amalgam, and in a nitrogen atmosphere, also can form fulminate of mercury. At the elevated temperatures this compound can explode violently. (The Wills Point, Tex., "Chronicle" reported several such explosions in Mr. Anderson's facility in that community in 1979 and 1980). Additionally, as no provisions are made for the collection of the mercury fumes, which are highly poisonous, the atmosphere of the fabricating facility would be exceedingly hazardous to the operators.

In other words, though the patent claims a combination of an amalgam of mercury, sodium and aluminum with a catalytic alloy, no such combination can exist following the described procedure. The amalgam would be destroyed, thus allowing the sodium and aluminum to separate; the homogenous mixing of the elements with the catalysts could not occur; thus the purpose of the invention is defeated.

In order for the chemical reactions to occur as described, it is necessary that water be brought into intimate contact with the sodium, that the formed sodium hydroxide be brought into intimate contact with the aluminum, and that the formed sodium-aluminum hydroxide be brought into intimate contact with the catalyst. By forming the alloy into a block in which the sodium and aluminum have been separated (no longer existing as an amalgam), and in which the major portion of the constituents are in the interior of the block, the contact of the water is limited to the surface of the block and the major portion of the alloy is therefore inert. It is interesting to note, as reported in "Texas Monthly", that in the decades following the issuance of the patents Mr. Anderson was unable to actually fabricate and use his invention.

SUMMARY OF THE INVENTION

The present invention provides a method for combining sodium and aluminum into a single, substantially homogeneous alloy without the need to use potentially dangerous, toxic mercury compounds. The present invention also provides a catalytic alloy that is capable of dissociating water into hydrogen and oxygen, thereby allowing the hydrogen to be utilized as fuel.

In one embodiment, the invention relates to a substantially homogeneous catalytic alloy, containing aluminum, sodium, and lead. The lead allows the aluminum and the sodium to be combined together in a homogeneous solid solution without the need to form amalgams using mercury. In addition to the sodium, aluminum, and lead, the catalytic alloy can also contain other elements, such as platinum, copper, antimony, chromium, or combinations of one or more, or all, of these.

In another embodiment, the invention relates to a hydrogen production system, containing a reaction vessel having disposed therein the catalytic alloy described above, at least one inlet conduit adapted to conduct water to the reaction vessel, and at least one outlet conduit adapted to conduct hydrogen from the reaction vessel.

In another embodiment, the invention relates to a method of producing a substantially homogeneous alloy of aluminum and sodium by:

combining metallic materials comprising aluminum, sodium, and lead in an inert atmosphere;

heating the resulting mixture to a temperature of at least around 600° C.;

maintaining the temperature of this mixture above this minimum until the mixture is substantially molten; and cooling the resulting molten mixture to form a substantially homogeneous alloy.

The invention will be more clearly understood by reference to certain of its specific embodiments, described in more detail below, which are not intended to limit the scope of the appended claims or of equivalents thereto.

DETAILED DESCRIPTION OF SPECIFIC EMBODIMENTS

Without wishing to be bound by any theory, it is believed that the reactions of a catalytic alloy containing sodium and aluminum with water can be summarized as follows:

$$2Na+2H_2O \rightarrow 2NaOH+H_2\uparrow$$

$$6H_2O+2Al+6NaOH \rightarrow 2Na_3Al(OH)_6+3H_2\uparrow$$

In addition, it is believed that the presence of other catalytic species in the alloy, such as platinum, copper, antimony, chromium, or combinations of these, can dissociate the $Na_3Al(OH)_6$ complex according to the reaction:

$$Na_3Al(OH)_6 +_{heat\ of\ reaction} +_{catalyst} \rightarrow 3Na+Al+3H_2\uparrow+3O_2\uparrow$$

It can be computed from the foregoing that the stoichiometric ratio of aluminum to sodium to insure complete reaction is 1:5.13.

In general, it is desirable for the sodium present in the alloy to be in metallic form, and to be present in an amount ranging from about 0.1 parts by weight (pbw) to about 10 pbw, more particularly about 5 pbw, based on 1 pbw aluminum. It is desirable that lead be present as metallic lead in amounts ranging from about 0.1 pbw to about 10 pbw, more particularly about 7 pbw, based on 1 pbw aluminum. If present, it is desirable that platinum be in the form of metallic platinum or platinum black, in amounts ranging from about 0.01 pbw to about 0.1 pbw, more particularly about 0.04 pbw platinum, based on 1 pbw aluminum. If present, it is desirable that copper be present as metallic copper in amounts ranging from about 10 pbw to about 20 pbw, more particularly about 15 pbw copper, based on 1 pbw aluminum. If present, it is desirable that antimony be present as metallic antimony in amounts ranging from about 0.5 pbw to about 2.0 pbw, more particularly about 1.3 pbw antimony per pbw aluminum. If present, it is desirable that chromium be present in metallic form and in amounts ranging from about 0.1 pbw to about 1.0 pbw, more particularly about 0.5 pbw, per pbw aluminum.

In order for the catalytic alloy to function properly it is necessary that the stoichiometric quantities of aluminum and sodium be homogeneously distributed throughout the resulting alloy on an almost molecular level. In embodiments containing additional catalytic species, these elements should be in intimate contact with the additional species. Irrespective of whether the additional catalytic species are present, it is desirable that aluminum and sodium be exposed to the water to be dissociated. To produce a catalyst that accomplishes these objectives the following procedure has been devised. The description in Example 2 relates to a catalytic alloy having sodium, aluminum, lead, platinum, copper, antimony, and chromium. A similar procedure can be used to prepare other catalytic alloys wherein one or more of these components have been omitted (except for sodium, aluminum, and lead) or wherein other components have been added.

EXAMPLE 1

A containment chamber was evacuated with a vacuum pump, and then flooded with argon gas to create an inert atmosphere. One (1) gram of aluminum pellets, 0.85 g sodium metal, and 0.60 g lead shot were placed into a crucible in the inert atmosphere and heated to about 600° C. The metals were thoroughly mixed, and the temperature of the mixture raised to about 900° C. The molten mixture was then poured into a conical mold and cooled to form an alloy button.

The alloy button was placed into a filtering flask containing 100 ml of distilled water, and the flask securely sealed with a rubber stopper. Upon contact with the water, hydrogen was evolved, and collected in a water-filled gas trap. The collected hydrogen was conducted to a nozzle, where it burned with a colorless flame.

EXAMPLE 2

The entire fabrication process should take place in an inert, desiccated atmosphere. This can be accomplished by replacing the air in an enclosed sealed chamber with either argon or helium, and circulating the inert gas constantly through a desiccant. A mixture of one part by weight aluminum powder, 5.13 parts by weight of sodium particles, and 0.04 parts by weight of platinum black powder is placed into a carbide crucible and thoroughly mixed. To this mixture is added 7 parts by weight of powdered lead. The crucible is placed into an electric furnace and the mixture heated to 600° C. Once the temperature is achieved it is maintained and the following ingredients are added sequentially. Copper powder, 15 parts by weight; antimony powder, 1.3 parts by weight; chromium powder, 0.5 parts by weight. The mixture is then heated to 1500° C. until the entire mass is liquid. While at this temperature the liquid alloy is slowly poured on to an oscillating ceramic paddle which breaks the stream into small droplets. These droplets are allowed to fall into a refrigerated stainless steel tube where they coalesce into a porous mass of solid particles. The mass is allowed to cool to ambient temperature, is removed from the stainless steel tube and placed into an air tight plastic bag. The finished alloy may then be taken from the inert, desiccated atmosphere, and is ready for utilization.

It is understood that all of the various combinations of ingredients as described in the Anderson patents may be fabricated in this manner, provided that first the aluminum and sodium (and optionally platinum) are alloyed with lead, and then the additional catalysts and extenders are added sequentially and then heated to a liquid temperature. The formation and solidification of the alloy into small droplets to form a porous mass is essential to maximizing contact between the active, catalytic species in the alloy and water molecules in the dissociation of water. The larger surface area and intimate contact by water with the various ingredients of the alloy will allow the accomplishment of the goal desired, but not realized, by the Anderson patents.

In use the porous mass of catalytic alloy can be placed into a cylindrical metal tube fitted at one end with a connection for the input of water and at the other with an outlet for the generated gases. The rate of reaction, thus the quantity of gases formed, will be in direct proportion to the quantity of water injected into the apparatus. The reaction begins simultaneously with the input of water and ceases when the water flow is turned off.

As the gases are generated in stoichiometric proportions there is sufficient oxygen present to completely combust the generated hydrogen without the necessity of additional air or oxygen. The gases can therefore be ignited and combusted in a closed system. In a conventional internal combustion engine system the surplus gas contained in the inspirated air necessary for compression to achieve useable power could be replaced by injected water vapor. This would provide the necessary expansion of gases and water vapor to provide useable power and simultaneously eliminate all noxious emissions, replacing the COX and NOX emissions with pure water vapor. The water vapor could be condensed and re-used in the process. The resulting internal combustion system would then be totally closed loop and no emissions of any kind would occur.

The invention has been described above by reference to certain of its specific embodiments. Those of skill in the art will, in view of the above description, recognize other variations and embodiments that do not depart from the spirit and scope of the invention, and are intended to fall within the scope of the appended claims and equivalents thereof.

What is claimed is:

1. A substantially homogeneous mercury-free catalytic alloy, comprising:
   aluminum;
   sodium;
   platinum; and
   lead.

2. The catalytic alloy of claim 1, further comprising copper.

3. The catalytic alloy of claim 2, further comprising antimony.

4. The catalytic alloy of claim 3, further comprising chromium.

5. The catalytic alloy of claim 2, further comprising chromium.

6. The catalytic alloy of claim 2, wherein the copper is present as metallic copper in an amount ranging from about 10 to about 20 parts by weight per part by weight of aluminum.

7. The catalytic alloy of claim 6, wherein the copper is present in an amount of about 15 parts by weight per part by weight of aluminum.

8. The catalytic alloy of claim 1, further comprising antimony.

9. The catalytic alloy of claim 8, wherein the antimony is present as metallic antimony in an amount ranging from about 0.5 to about 2.0 parts by weight per part by weight of aluminum.

10. The catalytic alloy of claim 9, wherein the antimony is present in an amount of about 1.3 parts by weight per part by weight of aluminum.

11. The catalytic alloy of claim 1, further comprising chromium.

12. The catalytic alloy of claim 11, wherein the chromium is present as metallic chromium in an amount ranging from about 0.1 to about 1.0 part by weight per part by weight of aluminum.

13. The catalytic alloy of claim 12, wherein the chromium is present in an amount of about 0.5 part by weight per part by weight of aluminum.

14. The catalytic alloy of claim 1, wherein the sodium is present as metallic sodium in an amount ranging from about 0.1 to about 10 parts by weight, per part by weight aluminum.

15. The catalytic alloy of claim 14, wherein the sodium is present in an amount of about 5 parts by weight per part by weight aluminum.

16. The catalytic alloy of claim 1, wherein the lead is present as metallic lead in an amount ranging from about 0.1 to about 10 parts by weight lead per part by weight aluminum.

17. The catalytic alloy of claim 16, wherein the lead is present in an amount of about 7 parts by weight per part by weight aluminum.

18. The catalytic alloy of claim 1, wherein the platinum is present as platinum black in an amount ranging from about 0.01 to about 0.1 parts by weight per part by weight of aluminum.

19. The catalytic alloy of claim 18, wherein the platinum is present in an amount of about 0.04 parts by weight per part by weight of aluminum.

20. A method of dissociating water into hydrogen and oxygen, comprising contacting the water with the catalytic alloy of claim 1.

21. A hydrogen production system, comprising:
   (a) a reaction vessel containing a catalytic mercury-free alloy comprising:
      (1) aluminum;
      (2) sodium;
      (3) platinum; and
      (4) lead;
   (b) one or more inlet conduits adapted to conduct water to the reaction vessel; and
   (c) one or more outlet conduits adapted to conduct hydrogen from the reaction vessel.

22. A method of producing a substantially homogeneous mercury-free alloy of aluminum and sodium, comprising:
   combining metallic materials comprising aluminum, sodium, and lead in an inert atmosphere;

heating the resulting mixture to a temperature of at least around 600° C.;

maintaining the temperature of this mixture above this minimum until the mixture is substantially molten;

forming the substantially molten mixture into small droplets; and cooling the resulting molten mixture to form a substantially homogeneous alloy;

wherein the cooling of the molten mixture comprises allowing the small droplets to cool and coalesce into a mass of solid particles.

23. The method of claim 22, wherein the small droplets are formed by directing a stream of the substantially molten mixture onto an oscillating paddle.

* * * * *